March 7, 1950 C. R. CARNEY 2,499,903
ICE TRAY AND GRID
Filed Sept. 21, 1938
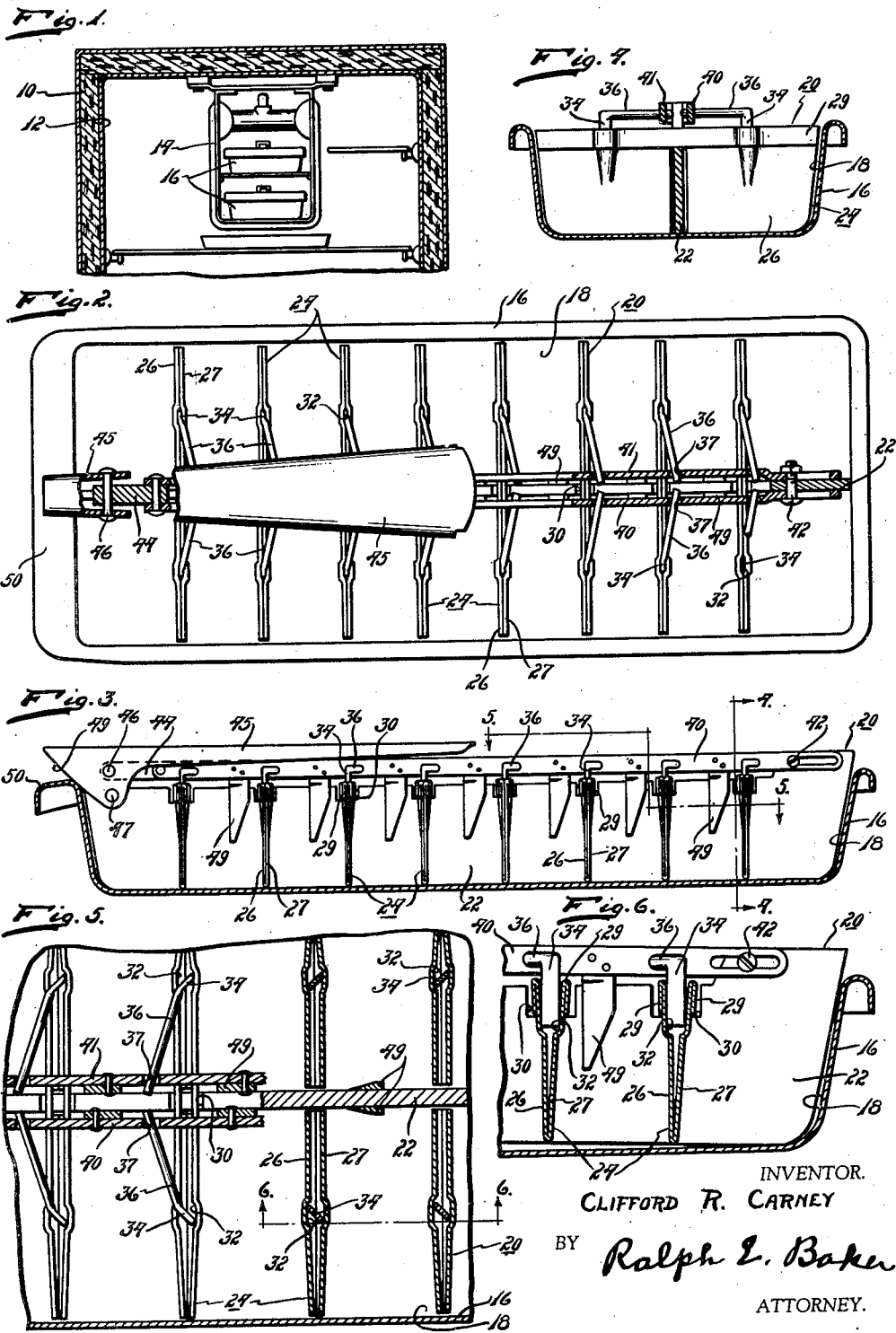
INVENTOR.
CLIFFORD R. CARNEY
BY Ralph L. Baker
ATTORNEY.

Patented Mar. 7, 1950

2,499,903

UNITED STATES PATENT OFFICE 2,499,903

ICE TRAY AND GRID

Clifford R. Carney, Miami, Fla., assignor to Nash-Kelvinator Corporation, Detroit, Mich., a corporation of Maryland Application September 21, 1938, Serial No. 230,944

3 Claims. (Cl. 62—108.5)

The present invention pertains to ice trays, and more particularly to the releasement of contents frozen therein.

It is an object of the present invention to provide a freezing tray that is divided into a plurality of compartments by a removably associated grid so constructed and arranged to allow for the removal of the contents frozen in each of the compartments easily and quickly, without impairment as to their size, shape or form.

It is another object of the present invention to provide a freezing tray with a removably associated grid assembly so arranged and constructed that the frozen cubes will be, when desired for use, loosened in the grid without becoming crushed and crumbled by any excessive movement of the grids.

It is another object of the present invention to provide a freezing tray with a grid which is arranged to be manipulated to loosen the frozen cubes from the tray and from the walls of the grid, but which is so arranged that a slight force is applied to the cubes by walls of the tray so that the grid and loosened cubes may be removed as a unit from the tray and individual cubes picked by hand from the grid at will to thus enable the replacement of the grid and unused cubes into the tray for preservation.

It is another object of the present invention to provide a structure that is economical of manufacture, durable in structure and one which is formed of a minimum number of parts.

The invention itself, however, both as to its organization and its method of operation, together with additional objects and advantages thereof, will best be understood from the following description of specific embodiments when read in conjunction with the accompanying drawings, in which:

Fig. 1 is a fragmentary cross sectional view of a refrigerator illustrating the invention applied;

Fig. 2 is a top plan view of the invention with parts broken away and parts shown in section;

Fig. 3 is a side elevational view of the invention with the tray shown in cross section;

Fig. 4 is a cross sectional view taken substantially on line 4—4 of Fig. 3;

Fig. 5 is a fragmentary cross sectional view taken substantially on line 5—5 of Fig. 3, illustrating a stage of operation; and Fig. 6 is a fragmentary cross sectional view taken substantially on line 6—6 of Fig. 5.

In the drawing, I have shown the invention as applied in a refrigerator 10 having a food compartment 12 whose temperature is controlled and held by the action of the refrigerant in passages provided in an evaporator 14. The gaseous refrigerant is withdrawn, compressed, condensed and returned to the evaporator by means of a suitable compressor-condenser apparatus (not shown). The evaporator has provisions for the reception of the invention, as embodied in the trays 16 for the freezing of its contents.

The tray 16 is divided into a plurality of small compartments 18 by a loosely positioned grid assembly 20 which comprises a longitudinally extending grid 22 intersected by a series of parallel grids 24. The grids 24 are formed of plates folded into sections 26 and 27. The free end of each section is doubled upon itself as at 29. The grids 24 are each inwardly slitted from its bottom, or folded edge, to cooperate with a respective notch 30 formed in grid 22 to permit their interlocking in a planular intersection. The notches 30 are so formed and arranged in grid 22 as to spatially hold and position the grids 24.

Formed in each of the grids 24, preferably approximately midway between its outer end, and its intersection with grid 22, are pockets 32 for receiving the angularly turned flat portion 34 of the arm 32. The pocket 32 is formed by outwardly pressing a portion of section 26 to form a semi-cavity that cooperates with a similarly formed cavity in section 27, forming a pocket of the same cross sectional design as the flat portion 34 when in normal position (see Fig. 2). The flat portion 34 fits rather snugly in pocket 32. The opposite end of arm 36 is disposed in an opening 37 formed in a respective drawbar 40 or 41.

The drawbars 40 and 41 extend parallel to each other, longitudinally with the grid 22 and are slidingly secured at one end by a bolt and a nut 42 to one end of the wall 22. The opposite end of the drawbars are secured together by link 44, which in turn is operatively secured to a handle or lever 45. The lever 45 is pivotally secured by pin 47 to grid 22. Secured to the inner side of each drawbar are a plurality of knife-like blades 47 adapted to lie in close proximity to the face of grid 22, and to be so drawn by the bars, as the handle 45 is operated, to sever the bond or adhesion of a frozen solid from grid 22.

As the contents of tray 16 becomes frozen, the solids become bonded to the surfaces of both the tray and grids. To break this bond so that the cubical solids may be removed without changes as to size or shape as frozen in the compartments 18, in an easy and quick manner, the handle or lever 45 is brought into operation. As the lever is rocked upwardly, pivoting on pin 47, the forward edge 49 of the lever by its cam design will upon engagement with the rolled edge 50 of tray 16 effect a forward and upward movement of the grid assembly 20 relative to the tray 16, thus breaking or severing the bond of the frozen cubes with the tray. Continuing the swing of lever 45 will further draw the bars 40 and 41 (see Figs. 5 and 6) so as to rock the arms 36 sufficiently to turn the flat portion 34 within the pocket 32, thus spreading the sections 26 and 27 sufficiently apart so that each section is inclined as at 52, tapering each compartment. That is, the vertical grids 24 have been inclined towards each other by this spreading of the sections 26 and 27, causing the top end of each compartment to be narrowed slightly to break the ice bond between the horizontally extending grids. A movement of the horizontal walls a few thousandths of an inch should be sufficient to free the cubes from such walls.

The walls are separated at the pocket 32, the walls being constructed of resilient material, and automatically return to the position shown in Fig. 2 when flat portion 34 is returned to the position shown in Fig. 2. The grid walls separate mostly at the pockets and the remainder of the walls assume a tapered position from the pockets to the terminating edges because the ice cubes tend to cause the grids to assume such a position. By this arrangement, the user need have no fear of crushing the cubes as each is immediately loosened insofar as its ice bond is concerned, but held slightly in place by the horizontal walls of the grid adjacent the pockets 32. The cubes may then be removed easily by the user's fingers one at a time and when sufficiently removed the remainder will stay in place in the grid to be returned to the pan for preservation in the cooling element.

While I have described the preferred form of my invention, I do not wish to limit myself to the precise details as shown, but wish to avail myself of such variations and modifications as may come within the scope of the appended claims.

I claim:

1. In a freezing apparatus, the combination of a tray, a grid within said tray for dividing said tray into a plurality of cells for forming ice cubes, said grid including a single thickness dividing member having a notch provided in one of the horizontally positioned edges thereof, a double wall dividing member extending transversely across said single thickness dividing member and movable relative thereto and having a portion extending into said notch to limit the relative movement between said members and means associated with the upper portion of the double wall member for expanding the upper portion of said double wall member to loosen the ice cubes from said grid.

2. In a tray of the character described including a grid having a longitudinal and transverse grid plates dividing the tray into separate compartments for forming individual blocks of ice when a liquid is frozen in the tray, ice release shoes carried by the longitudinal grid plate and engaging the adjacent side faces of the blocks of ice, a reciprocable member for shifting said shoes relatively to said grid plate, an actuating lever pivoted on the longitudinal grid plate, and a link connecting the reciprocable member with the actuating lever.

3. In a freezing apparatus, the combination of a tray, a grid within said tray for dividing said tray into a plurality of cells for forming ice cubes, said grid including a single thickness dividing member having a notch provided in one of the horizontally positioned edges thereof, a double wall dividing member extending transversely across said single thickness dividing member and movable relative thereto and having a portion extending into said notch to limit the relative movement between said members, a reciprocable member mounted on said grid, and means carried by said reciprocable member and having engagement with said double wall member for expanding the upper portion of said double wall member on movement of said reciprocable member to loosen the ice cubes of said grid.

CLIFFORD R. CARNEY.

REFERENCES CITED

The following references are of record in the file of this patent:

UNITED STATES PATENTS

| Number | Name | Date |
|---|---|---|
| 1,630,140 | Sibbald | May 24, 1927 |
| 1,746,587 | Hanley | Feb. 11, 1930 |
| 1,940,680 | Geyer | Dec. 26, 1933 |
| 2,140,923 | Saler | Dec. 20, 1938 |
| 2,444,789 | Reeves | July 6, 1948 |